(12) United States Patent
Peping

(10) Patent No.: US 6,185,655 B1
(45) Date of Patent: Feb. 6, 2001

(54) COMPUTER SYSTEM WITH DISTRIBUTED DATA STORING

(75) Inventor: Jacques Peping, Taverny (FR)

(73) Assignee: Bull, S.A., Louveciennes (FR)

(*) Notice: Under 35 U.S.C. 154(b), the term of this patent shall be extended for 0 days.

(21) Appl. No.: 09/142,859

(22) PCT Filed: Jan. 22, 1998

(86) PCT No.: PCT/FR98/00110
§ 371 Date: Sep. 16, 1998
§ 102(e) Date: Sep. 16, 1998

(87) PCT Pub. No.: WO98/33297
PCT Pub. Date: Jul. 30, 1998

(51) Int. Cl.[7] .................................................. G06F 12/00
(52) U.S. Cl. ...................................... 711/6; 711/1; 711/147
(58) Field of Search ............................... 711/6, 170–173, 711/147

(56) References Cited

U.S. PATENT DOCUMENTS

| | | | |
|---|---|---|---|
| 5,253,342 | * 10/1993 | Blount et al. | 709/232 |
| 5,367,698 | 11/1994 | Webber et al. | 709/203 |
| 5,446,854 | * 8/1995 | Khalidi et al. | 711/1 |
| 5,592,625 | * 1/1997 | Sandberg | 711/147 |
| 5,829,041 | * 10/1998 | Okamoto et al. | 711/147 |

FOREIGN PATENT DOCUMENTS

| | | |
|---|---|---|
| 0747840 | 12/1996 | (EP) . |
| 0774723 | 5/1997 | (EP) . |
| 8902631 | 3/1989 | (WO) . |

* cited by examiner

Primary Examiner—Do Hyun Yoo
Assistant Examiner—Nasser Moazzami
(74) Attorney, Agent, or Firm—Miles & Stockbridge P.C.; Edward J. Kondracki

(57) ABSTRACT

A data processing system (1) comprising distributed data storage resource ($D_1$–$D_3$, $FD_6$, $TL_4$, $STO_e$) under the control of a distributed management unit ($DSM_1$ through $DSM_6$), which may or may not be associated with a server ($S_1$ through $S_3$). This unit receives, from a centralized management unit (NSM), control programs which dynamically allocate to the unit to a virtual memory space comprising local storage units and all or some of the external storage resources.

32 Claims, 3 Drawing Sheets

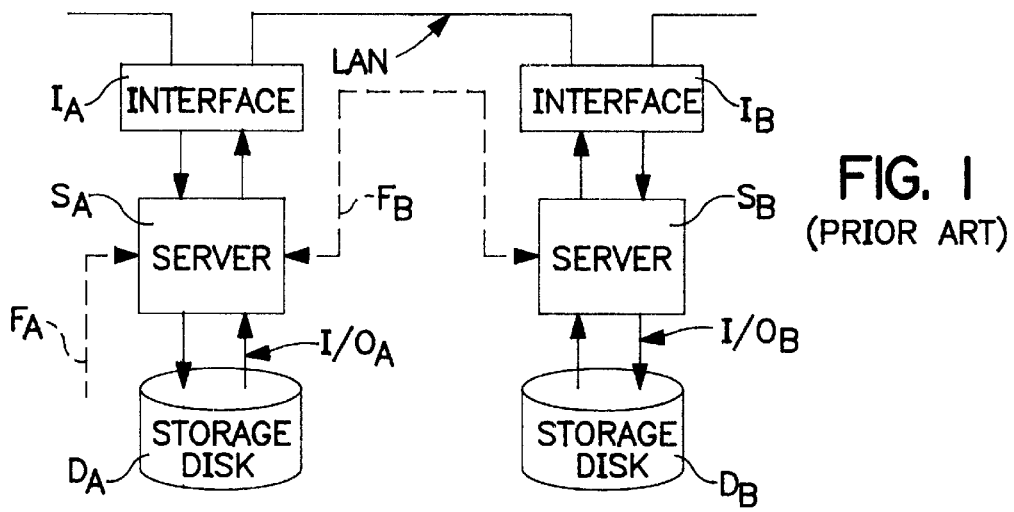
FIG. 1 (PRIOR ART)
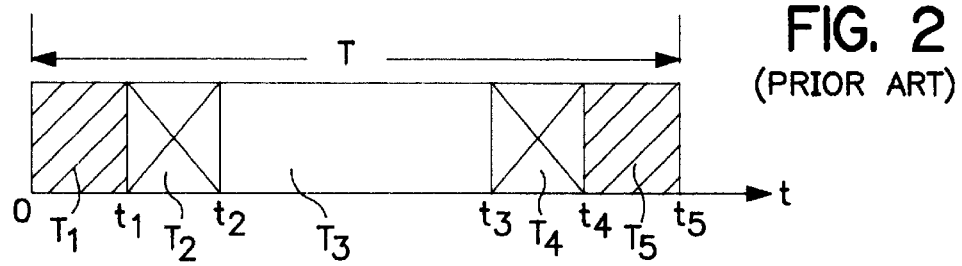
FIG. 2 (PRIOR ART)
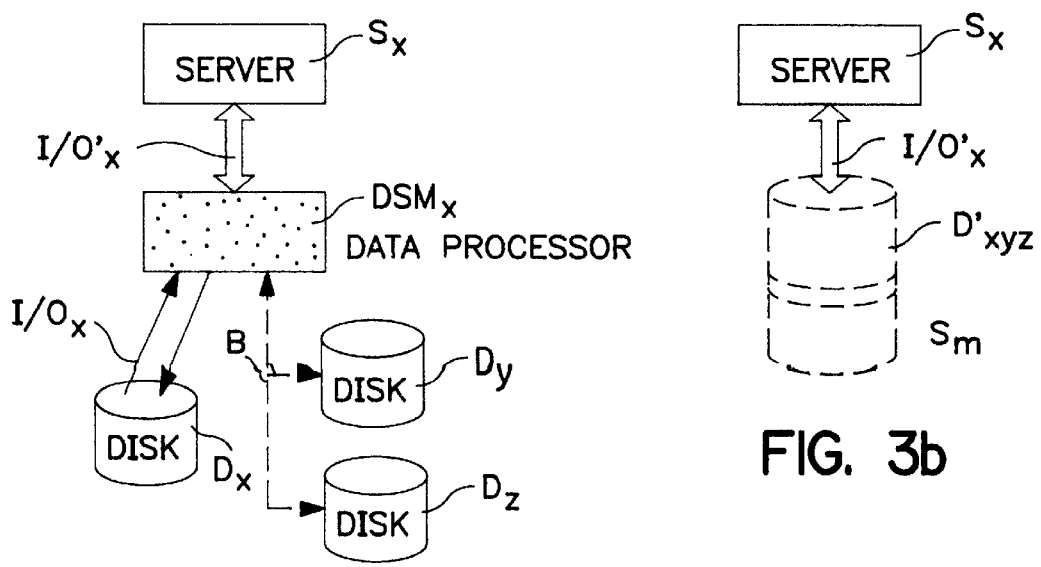
FIG. 3a
FIG. 3b

COMPUTER SYSTEM WITH DISTRIBUTED DATA STORING

BACKGROUND OF THE INVENTION

1. Field of the Invention

The present invention relates to a data processing system with distributed data storage and more particularly to a data processing system with a network architecture of the so-called "INTRANET" type, serving a business or an organization.

2. Description of Related Art

It is generally acknowledged that one of the key factors in the good health of a business or a company is directly dependent on the information in its possession. The term "information" should be understood in its most general sense. It includes internal company information (sales prices of products, production schedules, etc.) or information from outside the company (various data on the competition, of a commercial or technical nature, etc.).

In the current state of the art, the processing of this information naturally involves the use of increasingly powerful and complex data processing systems. The rapid reduction in the costs of hardware, particularly mass storage units (hard disks, magnetic tape or cartridge units, optical disks) makes it possible to store more and more data, locally or at remote sites.

Increasingly, data processing systems are joined in networks. Among these must be mentioned the rapidly expanding global "INTERNET" network, which allows dialogue among millions of computers spread throughout the world, including simple microcomputers for home use.

Likewise, companies use specific local area networks called "INTRANETS," which link the various data processing resources at one or more of their sites to one another.

Because of this, companies are faced with the urgent need to control the increasing ow of incoming information, and particularly, to store it in "places" where it can be easily accessed, moved and managed in the most efficient way possible, and at the lowest cost.

These data must also be protected, in the broadest sense of this term. In general, the concept known by the French abbreviation "D.I.C." (for "Availability, Integrity, Confidentiality") applies.

In effect, it is necessary to ensure the integrity of the data, whether against system failures or against malicious actions. It is also necessary to take "reservation" measures, since certain data can be confidential, or at least be limited to access by authorized users. Lastly, they must be made as available as possible, which specifically involves the use of backup measures or a certain redundancy in their storage, in order to compensate for hardware deficiencies or software errors.

Finally, once the choice of a storage system has been made, it is necessary to ensure the perenniality of the system. Specifically, it must be possible to adapt to future technologies without substantial modifications of the system.

SUMMARY OF THE INVENTION

The object of the invention is a system intended to meet the above-mentioned needs.

For this reason, it involves ensuring distributed data storage using a generalized virtual addressing of the distributed storage resources in a data processing system.

Therefore, the subject of the invention is a data processing system comprising a plurality of distributed data storage means and at least one server for storing the distributed data, characterized in that it comprises means for allocating to each of the data storage servers a virtual memory space whose extent is at least equal to the accumulated capacity of all or some of the distributed data storage means.

According to a preferred variant embodiment of the invention, the system essentially comprises centralized management means and distributed management means associated with at least one storage resource of the data processing system, as well as a high-speed communication bus which connects these distributed management means to one another and to the centralized means.

BRIEF DESCRIPTION OF THE DRAWINGS

The invention will be better understood and other characteristics and advantages will become apparent with the reading of the description given below in reference to the appended figures, which include the following:

FIG. 1 schematically illustrates an example of a data processing architecture of the network type according to the prior art;

FIG. 2 is a timing chart illustrating the exchange of data between two servers in a network of this type;

FIGS. 3a and 3b schematically illustrate a basic architecture operating according to the invention;

DESCRIPTION OF THE PREFERRED EMBODIMENTS

Figure 4:
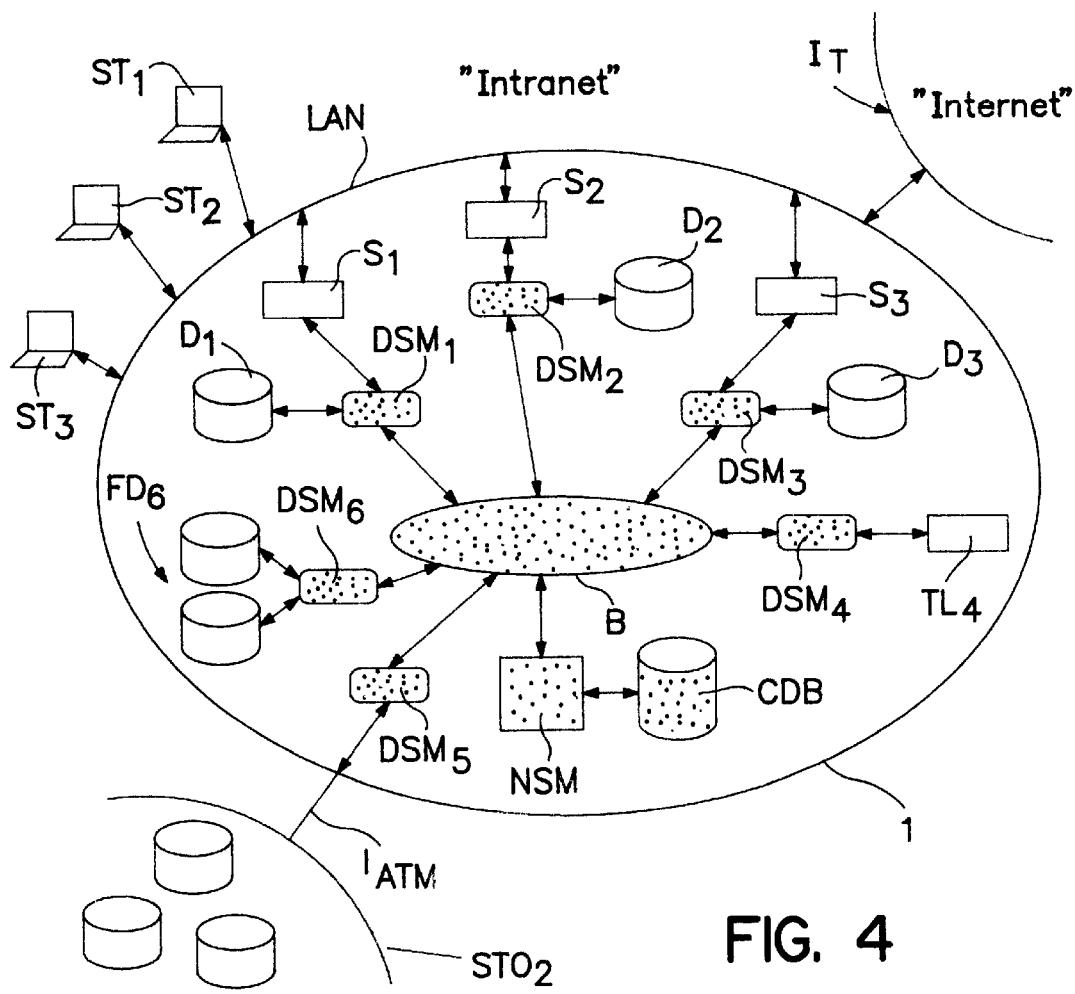
FIG. 4 schematically illustrates an exemplary embodiment of an architecture of a complete data processing system of the network type according to the invention.

FIG. 1 illustrates an example of a data processing system architecture of the network type according to the prior art. For simplicity's sake, the drawing represents only two units, connected to a local area network of the "LAN" type. This network can be any type and have can any configuration: bus (for example of the "ETHERNET" type) or ring (for example of the "TOKEN RING" type). In FIG. 1, there are assumed to be two servers, $S_A$ and $S_B$, respectively. The server $S_A$ could be replaced by a work station or a simple microcomputer. These servers $S_A$ and $S_B$ are physically connected to the bus of the LAN type via standard interfaces $I_A$ and $I_B$, which depend on the nature of the bus. They specifically comprise buffer storage means and coding and decoding means which make it possible, in particular, to recognize a destination address. Each server is assumed to be associated with mass storage means, illustrated by the hard disks $D_A$ or $D_B$ connected to the corresponding server by means of input/output channels, $I/O_A$ or $I/O_B$, respectively. Hereinafter, for simplicity's sake, this network will be designated by the abbreviation LAN.

There are two main methods for exchanging data.

Locally, the data processing unit, for example the server $S_A$, which intends to read- or write-access memory addresses of its own disk $D_A$, uses elementary instructions that act directly on the read/write heads of the disk. These elementary instructions are of the "Input/Output" type known by the English name "I/O Channel." The protocol used is the "memory address" type. The access is nearly instantaneous. It depends on the characteristics of the disk drive (average access speed, throughput, etc.) and of the mode used, the latter being, for example, the type known and standardized (by the ANSI as well as the ISO) by the name "SCSI" for "Small Computer System Interface." FIG. 1 illustrates the reading of a file $F_A$ from the disk $D_A$, in accordance with this mode of data exchange. The data related to this file $F_A$ are read directly on the tracks and sectors of the disk $D_A$, at predetermined addresses stored in an allocation table.

On the other hand, when intending to read data, for example a file $F_B$ stored in an external storage unit, in this case the disk $D_B$ attached to the server $S_B$, it is necessary to pass through the network LAN, the servers $S_A$ and $S_B$, and the interfaces $I_A$ and $I_B$. The server $S_A$ can no longer directly control the heads of the hard disk $D_B$. The exchanges are carried out in accordance with a data packet communication mode, which uses messages and implements a particular protocol specific to the type of local area network used.

The timing chart of FIG. 2 schematically illustrates a data exchange of this type through the network LAN. The total time required to exchange a packet of elementary data is at least equal to the time interval T, which is broken down into elementary time intervals $T_1$ through $T_5$. The time interval $T_1$, between the arbitrary instants t=0 and t=$t_1$, corresponds to the processing time in the server $S_B$. The time interval $T_2$, between the instants t=$t_1$ and t=$t_2$, corresponds to time losses due to the particular communications protocol used and to the current transmission conditions prevailing in the network (load, number of units connected, etc.). The time interval $T_3$, between the instants t=$t_2$ and t=$t_3$, represents the transmission time. It essentially depends on the distance between two connected stations (the remoteness of the servers $S_A$ and $S_B$ in the example), on the throughput of the link, and to a lesser degree, on the physical nature of the link (signal propagation rate). The time interval $T_4$, between the instants t=$t_3$ and t=$t_4$, again represents the contribution of the communications protocol (on arrival). Finally, the time interval $T_5$, between the instants t=$t_4$ and t=$t_5$, represents the processing time on arrival.

It is easy to understand that this mode of exchange is much slower than the preceding mode. In addition to the useful data (for example those related to the file $F_B$), additional data must be transmitted, including protocol-specific data and address data (source and target). In order to handle errors, it is also necessary to transmit redundant data (parity bits, error detecting and/or correcting codes). Moreover, it is necessary handle the contentions and collisions that are possible in the bus or the ring, as the case may be. In order to solve these problems, specific methods such as "CSMA/CD," from the English term "Carrier Sense Multiple Access/Collision Detection" have been proposed; they are the subject of the recommendations of IEEE standard 802.3. These phenomena also contribute to an increase in the average transmission time.

According to a chief characteristic of the invention, it involves the distributed storage of informational data on the various storage resources of a data processing system. For this purpose, each server is allocated a very high-capacity virtual memory space, which includes its own disk(s), if any exist, as well as external disks and/or other data storage resources. The above-mentioned server is therefore capable of directly addressing all of the virtual memory space attached to it, using instructions of the "I/O channel" type described above. In other words, it controls virtual read/write heads.

FIGS. 3a and 3b schematically illustrate the basic architecture according to the invention.

In FIG. 3a, a server $S_x$, which can also be connected to the local area network LAN (FIG. 1), is associated, as above, with a local data storage unit, for example a disk $D_x$. According to an important aspect of the invention, the server communicates with the disk through either a physical unit or a logical unit $DSM_x$, which constitutes the distributed management means of the system according to the invention.

In the first case, when the unit $DSM_x$ is the physical type, it comprises data processing circuits with internally stored programs, physically connected to the disk $D_x$ by an input-output channel I/$O_x$, and to external disks, for example to the disks $D_y$ and $D_z$ by a specific system bus B, which will be described in detail below. This bus B also makes it possible to transmit instructions of the "I/O Channel" type to the above-mentioned disks $D_y$ and $D_z$. A specific program, stored in the physical unit $DSM_x$, of a type hereinafter called an "intelligent agent," allows this particular operation. As a non-limiting example, the unit $DSM_x$ can be constituted by an intermediate work station running on the "UNIX" registered trademark) operating system.

In the second case, when the unit $DSM_x$ is the logical type, the above-mentioned program is stored directly in the random access memory of the server $S_x$, and it is the latter that is physically connected to the various disks $D_x$ through $D_z$, the server playing its own role as well as that of the distributed management means ($DSM_x$). The latter is therefore a purely logical unit, integrated into the work station $S_x$.

In another variant of embodiment, the logical unit can be integrated directly into the electronic circuits associated with the storage resources, for example into the controller, in the case of a disk.

As illustrated more particularly by FIG. 3b, the server $S_x$ "sees" all of the disks $D_x$ through $D_z$ as a single virtual disk $D'_{xyz}$ of high or very high capacity. In this case, its capacity is at least equal to the accumulated capacity of the disks $D_x$ through $D_z$. Naturally, the total capacity of the virtual disk must be sized so as to be adapted to the maximum disk space addressable by the arithmetic and logic unit of the server $S_x$. It follows that the server $S_x$ accesses tracks or sectors $S_m$ of the above-mentioned virtual disk $D'_{xyz}$ directly, as though this disk were a local disk. It sends instructions for moving the virtual heads and elementary read/write commands just as for a local disk, in accordance with the above-mentioned "I/O Channel" operating mode.

As will be described in detail below, in a preferred embodiment of the invention, a plurality of "intelligent agent" types are used. For purposes of the above-mentioned addressing, these particular agents can be called "storage agents." These are program parts loaded into a random access memory of the physical unit $DSM_x$, or alternatively, of the server $S_x$ when $DSM_x$ is a logical unit integrated into the server $S_x$.

These elementary programs have a dual role:
a/ routing to a particular storage unit, either local, for example $D_x$ or remote, for example $D_y$ and/or $D_z$, depending on the virtual track addressed;
b/ possibly adapting the addressing mode and translating the protocol as a function of the actual physical unit $D_y$ and $D_z$.

In effect, according to an advantageous aspect of the invention, the server $S_x$ can address storage units that are heterogeneous (different technologies and/or manufacturers, different operating modes, etc.). As a non-limiting example, the disk $D_x$ could be a disk storing words coded in "ASCII"

("American Standard Code for Information Interchange") with a length of 32 bits, the server $S_x$ running on the "UNIX" operating system, while the disks $D_y$ and $D_z$, being disks attached to a large-scale, so-called "Main Frame" computer, store words coded in "EBCDIC" (Extended Binary Coded Decimal Interchange Code") with a length of 36 bits.

The physical unit $DSM_x$, or its logical equivalent if it is integrated into the server $S_x$, renders the operations for addressing the disk $D'_{xyz}$ completely transparent, whether it is the local disk $D_x$ or the external disks $D_y$ or $D_z$ that are physically storing the information. More precisely, it is the specialized intelligent agent recorded, or the intelligent storage agent in this specific case, that accomplishes this task. The server $S_x$ addresses the virtual disk $D'_{xyz}$ by means of a virtual input/output channel $I/O'_x$, as though it were its own local disk $D_x$ and using the only protocol(s) it "knows," for example the one associated with the local disk $D_x$.

FIG. 4 schematically illustrates an exemplary data processing system 1 with a network architecture, which includes dispositions specific to the invention (represented in gray shading in the figure).

It is assumed that the local area network LAN is the "INTRANET" type. This type of network locally integrates the technologies belonging to the "INTERNET" network. This network interfaces $I_A$ and $I_B$. The server SA can no longer directly control comprises servers using the basic INTERNET communications protocol known by the abbreviation "TCP/IP." It also includes other communication protocols such as "HTTP," "NFS," etc., also used in the "INTERNET" network. All of these protocols are standardized.

It is also assumed that the local area network LAN communicates with the "INTERNET" network $I_T$, for example by means of one of the servers listed below.

Connected to this local area network LAN are work stations $ST_1$ through $ST_3$ and storage servers, $S_1$ through $S_3$, in the example described. These storage servers, $S_1$ through $S_3$, will hereinafter be called servers, for simplicity's sake.

According to one of the chief characteristics of the invention, the storage resources attached to each server $S_1$ through $S_3$ are attached to the latter via a physical or logical distributed management unit $DSM_1$ through $DSM_3$. In the example described, these resources are the three standard disk drives $D_1$ through $D_3$.

The data processing system 1 can comprise other storage units, such as a library of magnetic tapes or cartridges, $TL_4$, a set of disks $FD_6$, called a "disk farm,", or even remote storage resources, represented by the general reference $STO_e$. These storage resources are also managed by management units that are assigned to them, $DSM_4$, $DSM_6$ and $DSM_5$, respectively. The remote storage resource, $STO_e$, advantageously communicates with the unit $DSM_5$ via a link $1_{ATM}$, in the "ATM" mode (from the English term "Asynchronous Transfer Mode").

According to another aspect of the invention, the various distributed management units $DSM_1$ through $DSM_6$ are connected to one another via a very high-speed bus B. They are also linked, again via this bus B, to a centralized management unit NSM.

This latter unit, NSM, which can be constituted based on a work station, for example running on the "UNIX" operating system, comprises storage means, for example a disk, storing a data base CDB. These data comprise the description of the system, and in particular of all the storage resources and their characteristics (capacity, operating mode, protocols, etc.). They also comprise data describing the allocation of these storage resources to the various servers $S_1$ through $S_3$ of the data processing system 1. It must be clear that each storage resource, and more particularly the magnetic tape library $TL_4$, the "disk farm" $FD_6$ and/or the remote storage resources, $STO_e$, can be shared by a plurality of servers $S_1$ through $S_3$. This sharing can take place on a dynamic basis, in the sense that it is not set once and for all and/or that it depends on the applications currently running. The magnetic tape or cartridge library can be used specifically for periodic operations for backing up all or some of the data stored in the disks of the system 1, disks attached directly or indirectly to one or more servers $S_1$ through $S_3$.

From the above-mentioned data of the recorded data base CDB, the centralized management unit NSM develops, in a known way, the above-mentioned specialized programs, or "intelligent agents." To do this, according to an advantageous aspect of the invention, it takes advantage of a programming technology of the "JAVA-Applets" type, also used in conjunction with the "INTERNET" network. It uses an object-oriented language and an environment of the "runtime" type, which means that the programs can run automatically upon reception in the target unit. In effect, the running of these programs does not depend on the receiving environment (the operating system: "UNIX," "Windows NT," "Windows95," [registered trademarks], etc.). It is said to be a "Virtual JAVA Machine." "JAVA" applications can run in all the units in which a "Virtual JAVA Machine" is installed. The running of the programs is therefore independent of the platform used. Finally the communications are take place in the "Client-Server" mode.

The invention benefits from these advantageous characteristics. The "intelligent agents" are programmed in "JAVA" language and transmitted dynamically and selectively, via the high-speed bus B, to the various distributed management units $DSM_1$ through $DSM_6$, whether they be physical or logical (that is, in the latter case, combined with the servers). Upon reception, the programs run automatically in the units $DSM_1$ through $DSM_6$. In practice, this running translates into the downloading and storing of instructions into the random access memory of these units (or servers when the units $DSM_1$ through $DSM_6$ are logical).

These instructions specifically allocate, at a given instant, a virtual memory space (for example, in FIG. 3b: $D'_{xyz}$) to the server (for example $S_x$) associated with a given distributed management unit (for example $DSM_x$).

When a server, for example $S_1$, sends a request for the reading and/or writing of data in the virtual memory space allocated to it, the distributed management unit addresses, under the control of the downloaded instructions, either the local disk $D_1$ or an external disk, for example $D_3$. In any case, the addressing takes place in the "I/O Channel" mode, and not in the form of a communications protocol, by means of messages. For the local disk $D_1$, the addressing protocol is the one used by the server $S_1$. For the external disk $D_3$, the addressing is carried out by means of this same protocol, via the bus B and the distributed management unit $DSM_3$ associated with the disk $D_3$. This latter unit $DSM_3$ may have to translate the addressing protocol in the manner described, in order to compensate for the heterogeneity of the hardware used. The final addressing operation, that is the control of the read/right heads of the physical disk $D_3$, is carried out under the control of the instructions downloaded and stored in the distributed management unit $DSM_3$. These instructions originate, as before, from the automatic execution in $DSM_3$ of an "intelligent storage unit" transmitted by the centralized management unit NSM.

It must also be understood that a request by a server to write or read in its virtual disk space, can physically translate, at the end-of-chain, into the reading or recording of data on another medium, a magnetic tape or cartridge, for example. This is the case for a request initiated by the server $S_2$, for example, which leads to the unit $DSM_4$ and to the magnetic tape library $TL_4$. The resulting fundamental change in the type of addressing remains transparent for the server $S_3$. It is the instructions downloaded and stored in $DSM_4$ that perform the necessary protocol translations and adaptations. It is clear that, in this case, since $DSM_4$ is not connected to a server, it can only be a physical unit, not a logical one.

In order for the system to be able to meet the needs of the process of the invention, it is necessary for the bus B to accept a protocol of the above-mentioned "I/O Channel" type. In other words, the exchanges through the bus do not take place according to a communications type protocol.

For this reason, according to one aspect of the invention, the bus chosen is one that conforms to the so-called "Fiber Channel" standard, which is the subject of the ANSI standard X3.230 (1994). This type of bus is also called a "Fiber Backbone,". It is a bus that can convey data at very high speed. The main purpose assigned to a bus of this type is to transmit the data from one point to another with very little latency. Only a simple error correction is carried out, by the hardware and not by the software. The data are transmitted in both directions simultaneously. When a transmission fails because of congestion, it is re-initiated immediately without software intervention. Finally, this type of bus is compatible with high-level protocols such as "SCSI," indicated above. It also makes it possible to convey requests of the "I/O Channel" type.

There are three possible bus topologies: the "Point-to-Point" type, the so-called "Switched Fabric" type and the "Arbitrated Loop" type, similar to a "token ring."

Figure 5:
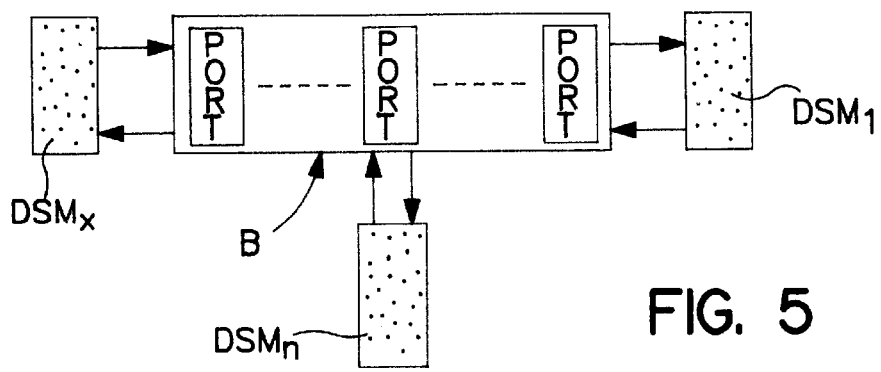
FIG. 5 schematically illustrates a bus topology used in the system according to FIG. 4.

Within the scope of the invention, the second topology, which offers the highest connection capacity, is chosen. FIG. 5 schematically illustrates a topology of this type. According to this topology, each device, that is, according to the invention, each of the distributed management units $DSM_1, \ldots, DSM_n$ through $DSM_x$, as well as the centralized management unit NSM, is connected to a switch and is equipped with one non-interlocking data channel for any other connection through the switch. This disposition is equivalent to a dedicated connection with any other unit. When the number of units increases and occupies a multitude of switches, these switches are in turn connected to one another. It is recommended that multiple connection channels be established between switches in order to create a redundancy of circuits and to increase the total pass band.

Although the standard allows for the possibility of using different physical media to produce the links (twisted pair, miniature coaxial or video cable, single-mode or multimode optical fiber), within the scope of the invention, single-mode optical fiber is chosen. This type of medium allows both very high speed (100 MB/s) and long distance links (up to 10 km).

The above choices make it possible to establish links which typically run from 10 m to 10 km, for speeds running up to 100 MB/s, and which can accommodate hundreds of parallel connections at the above-mentioned speeds. Finally, the bus B is compatible with numerous protocols, whether they are communications type protocols like the "TCP/IP" protocol, or high-level protocols of the "IO Channel" type (for example "SCSI"). The bus B is equivalent to a multitude of ports of the "I/O Channel" type.

Figure 6:
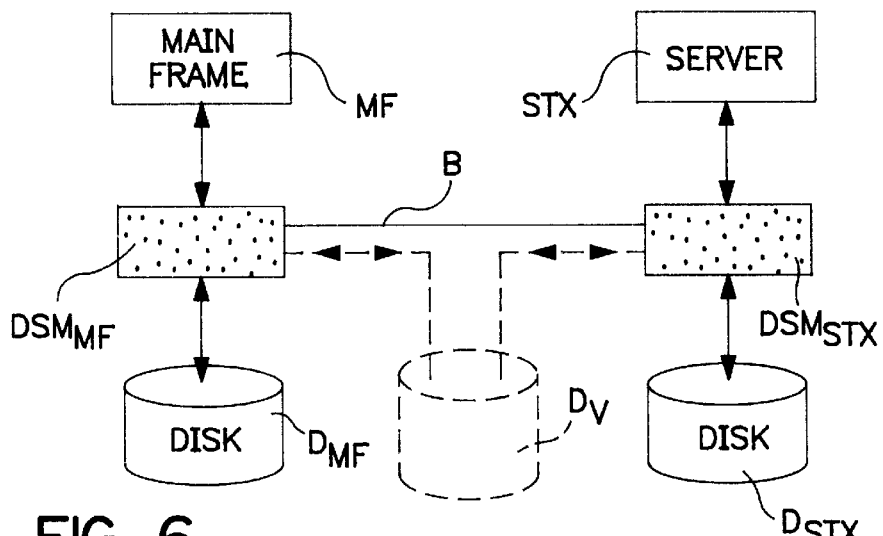
FIG. 6 illustrates the exchange of data between two particular data processing units of the data processing system of FIG. 4.

This makes it possible to significantly reduce the time required for data exchanges between two servers, typically in a ratio of one to ten. FIG. 6 schematically illustrates data exchanges between two servers: a computer MF of the "Main Frame" type and a work station STX running on the "UNIX" operating system. According to the chief characteristic of the invention, the local hard disks $D_{MF}$ and $D_{STX}$, respectively, are attached to the servers via distributed management units $DSM_{MF}$ and $DSM_{STX}$, respectively. It is assumed that the two disks are entirely shared by the two servers. Each server therefore sees the total disk space as a single virtual disk $D_v$ with a capacity equal to the sum of the two disks.

It is assumed that one of the servers sends a request, for example that the server MF sends a request to write or read data in the virtual disk $D_v$. This request is transmitted to the unit $DSM_{MF}$ for execution. If the physical disk space involved is not in the local disk space $D_{MF}$, the request will be transmitted to the unit $DSM_{STX}$, via the bus B. The latter, in the example provided, will carry out two operations: protocol translation (since, as indicated above, the data recording modes are different in the two disks: "EBCDIC" and "ASCII," respectively, with different word lengths) and the physical addressing of the disk $D_{SXT}$ based on the virtual address transmitted.

Figure 7:
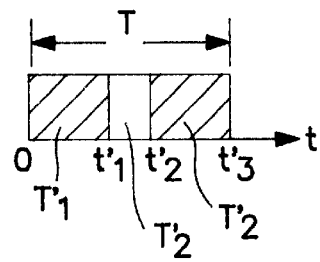
FIG. 7 is a timing chart illustrating the exchange of data between the two units of FIG. 6.

The timing chart of FIG. 7 details the time required for the above-mentioned exchange. The total time interval T' comprises no more than three phases: two extreme processing phases, $T'_1$ and $T'_3$, between the respective instants t=0 and t=t', on the one hand, and t=t'2 and t=t'3 on the other hand, and a phase for transmission via the bus B: $T'_2$, between the instants t=t'1 and t=t'2.

The time intervals $T'_1$ and $T'_3$ should be compared to the time intervals $T_1$ and $T_5$ of FIG. 2 (prior art). A priori, for identical hardware and processes/applications, these time intervals are equal. They depend only on the local data processing conditions, and not in any way on the transmission protocols or the transmission time.

On the contrary, in contrast to the prior art, there are no more time losses related to the communications protocol: the time intervals $T_2$ and $T_4$ (FIG. 2). This is due to the properties of the bus B, which is compatible with the high-level protocols (for example "SCSI"). Finally, because of the use of a very high-seed bus and the so-called "Switched Fabric" topology, the transmission time is reduced to its strict minimum. The time interval $T'_2$ is therefore much shorter than the homologous time interval $T_3$ (FIG. 2).

The total time interval T' required for an exchange is therefore reduced to essentially the local processing time intervals, and becomes practically independent of the transmissions between units. In other words, the exchanges between a local storage resource and a server, or between an external storage resource and this same server, take place at a speed that is, if not identical, at least quite comparable. Therefore, the performance of the system is not degraded, no matter what the location of the data storage resource. In still other words, any server $S_1$ through $S_3$ (FIG. 4) of the data processing system 1 can, a priori, access any storage resource, $D_1$ through $D_3$, $TL_4$, $FD_6$ or $STO_e$, without running the risk of degrading performance.

It also follows that the informational data can be distributed in optimized fashion in the various storage resources of the data processing system, at the same site or at a remote site (FIG. 4: $STO_e$) insofar as the transmission time (FIG. 6: $T'_2$) remains within acceptable limits.

The above-mentioned optimized distribution can be achieved by taking into account a number of criteria: performance levels (speeds) and/or capacities of the various storage resources, data types, temporary failures of one or more storage resources, whether total or partial, overflows, cost of the storage, etc.

The management of the distributed storage is handled, as has been indicated, by the centralized management unit, taking into account the data base CDB. It develops and dynamically downloads, into the various distributed management units $DSM_1$ through $DSM_6$, intelligent storage agents. The agents of this type convey instructions taking into account, in particular, the local conditions (type of hardware connected, local memory capacity, protocol used, etc.), the total virtual disk space allocated to a given server, and the address of the centralized management unit or the distributed management unit(s) which manage(s) the physical storage resource(s). These characteristics vary as a function of time. Also, the operations carried out under the control of the agents are dynamic.

In practice, the management is handled in a way that is similar to the management of a standard data-transmitting local area network. The centralized management unit NSM of what could be called a "network" of distributed management units $DSM_1$ through $DSM_6$ can be embodied by a data processing unit such as a "UNIX" server, or even combined with the management unit of the standard local area network LAN coexisting with the bus B.

In addition to the intelligent storage agents, other types of agents can be used to advantage within the scope of the invention.

A first type of additional agent is constituted by agents for managing special input-output operations. These agents are downloaded into certain storage nodes, that is, in practice, into the distributed management units associated with these nodes, in order to obtain specific results in the above-mentioned input-output operations. This could be a matter of, for example, optimizing the access times to data bases.

A second type of additional agent is constituted by agents which organize automatic backups as a function of a certain number of parameters: date, time, data type, etc. These agents organize the moving of data, by duplication, into predetermined storage means.

A third type of additional agent is constituted by agents which manage the archiving and the hierarchical storage of data among the storage resources present in the system. In particular, they make it possible to move the data from one resource to another, taking into account constraints such as access times, frequency of access, location and cost. More particularly, a specific agent is assigned to the distributed management unit $DSM_4$ attached to the magnetic tape or cartridge libraries $TL_4$, which can be called a "media server agent." It provides a virtual view of the physical storage objects and can accommodate input-output requests formulated by external servers. The latter can access these storage objects by sending standard read-write requests, as though they were dealing with their local storage resources, for example a disk. Because of this disposition, the application servers can benefit from any mass storage technology, whether this technology is currently operational or in the process of being developed, without modifying the applications.

A fourth type of agent is constituted by agents for managing redundant storage means, as a function of the profile, the data, the specific applications, and the cost incurred, for example. For security reasons, particularly the integrity and availability of the data, the latter are recorded with more or less pronounced redundancy, or even duplicated. Redundancy data are also added to the useful informational data: parity bits, error detecting codes ("EDC") or error correcting codes ("ECC"). These dispositions lead to various recording technologies: disks known as "mirrors" or "RAID5", that is, with parity bit calculation. The agents of this fourth type manage the utilization of one technology or another in an optimized way.

A fifth type of agent is constituted by agents which manage the connections with the remote data storage sites $STO_{e_i}$. As has been indicated, since the links operate in the "ATM" mode, it is necessary to perform a protocol translation from "Fiber Channel" to "ATM. The agent of this type is downloaded into the distributed management unit $DSM_5$, along with other agents (storage agents).

A sixth type of agent can be downloaded into one of the distributed management units in order to manage the exchanges with the "INTERNET" network and to route the data downloaded by this means to one or more storage resources of the data processing system.

A seventh type of agent is constituted by agents which monitor and manage the operation of all of the data storage resources.

Other types of agents can be developed, as needed, by the centralized management unit NSM and selectively downloaded to the distributed management units, via the bus B. Agents of this type are necessary each time a first protocol needs to be translated into a second one.

It has also been indicated that, in problems tied to data processing security, confidentiality must be taken into account. This aspect can also be handled using specialized agents. These agents can verify, for example, whether the requests are legitimate and/or reserved, as a function of the contents of the data, the user profiles or the resources accessed.

In the architecture presented in FIG. 4, two busses coexist: a local area ring network (in the example described) LAN and a bus specific to the invention, the high-speed bus B. According to this architecture, the communications between the storage servers $S_1$ through $S_3$ and the other units, for example the work stations $ST_1$ through $ST_3$, take place in standard fashion in the form of file transfers using communications protocols compatible with the type of local area network LAN.

However, since the bus B, which conforms to the "Fiber Channel" standard, is capable of conveying a plurality of protocols, including protocols of the communications type, it is entirely possible to eliminate the LAN network (FIG. 4) and to have all the transmissions pass through only the bus B.

Figure 8:
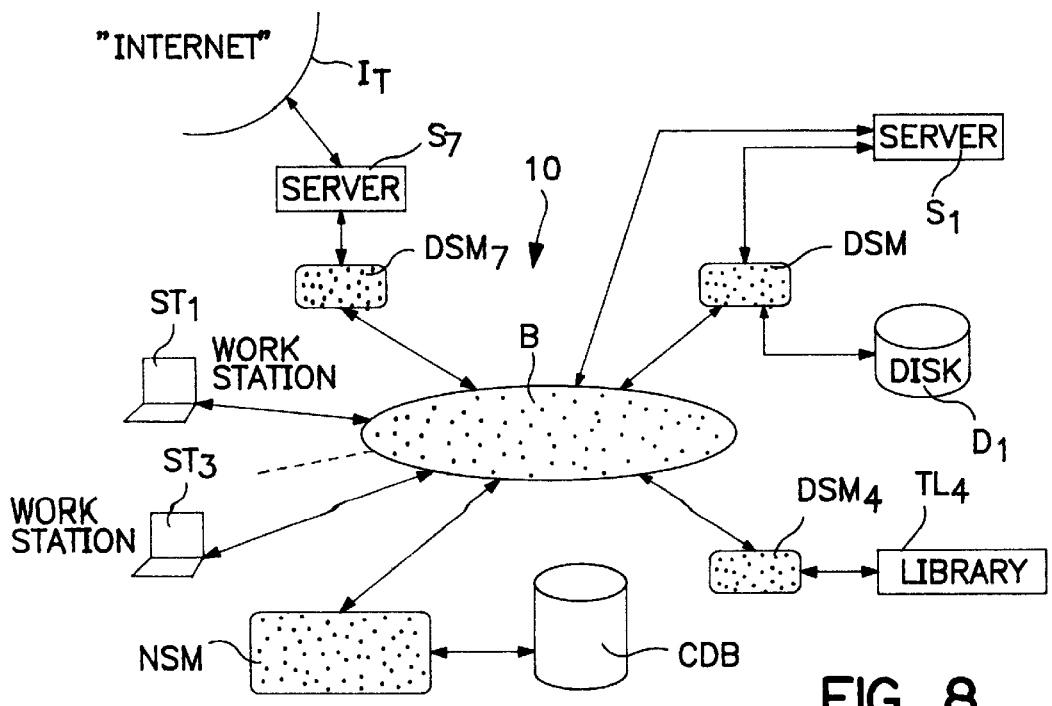
FIG. 8 illustrates a variant of the system according to the architecture of FIG. 4.

FIG. 8 schematically illustrates. an architecture of a data processing system 10 comprising only one type of bus, the bus B. All of the units, whether they are specific to the invention or not, are connected to this bus B. By way of example, FIG. 8 represents a server $S_1$ attached to a local disk $D_1$ via a distributed management unit $DSM_1$, a second server $S_7$, which manages the communications with the "INTERNET" network $I_T$ and is connected to the bus B via a distributed management unit $DSM_7$, a distributed management unit $DSM_4$ attached to the magnetic tape or cartridge library $TL_4$, the centralized management unit NSM and its data base represented by a disk CDB, as well as three work stations $ST_1$ through $ST_3$, now connected directly to the bus B. The work stations $ST_1$ through $ST_3$ communicate with one another in standard fashion, that is, using a communications protocol. In effect, as has been indicated, both protocol types can exist in the bus B. In this sense, the servers, for example the server S, can also be connected directly to the bus B and can communicate with other units (for example $ST_1$ through $ST_3$) using a communications protocol, for example TCP/IP."

By reading the above, it is easy to see that the invention clearly achieves the objects for which it is intended.

In particular, it offers each server a virtual view of a global storage space. A priori, it allows any server to access any storage resource of the system, no matter what its nature. Moreover, it makes it possible to access remote resources without any substantial degradation in performance.

It must be clear, however, that the invention is not limited to only the exemplary embodiments specifically described in relation to FIGS. 3a through 8. It accommodates many types of hardware. This is true, first of all, for the central data processing units, which can comprise microcomputers, work stations, minicomputers, or large-scale computers of the so-called "main frame" type. The operating systems can also be diverse and can, for example, include so-called universal or proprietary operating systems. In addition to the bus B, it can use various local area networks: busses (of the "ETHERNET" type, for example) or rings (of the "TOKEN RING" type, for example). Finally, and above all, the types of storage peripherals are not limited: magnetic disk units, optical disks, magnetic tapes and/or cartridges, at both local or remote sites, can be used.

What is claimed is:

1. A data processing system (10) comprising a plurality of distributed data storage units (D1–D3, FD6, TL4, STOe) and at least one data storage server (S1–S3) connected to a network for storing data,
a plurality of distributed management units (DSM1–DSM6) connected to one another to form a memory for local data storage and having memory space addressable by a protocol comprising input-output read-write instructions sent by a data storage server (S1–S3), wherein at least some of said distributed data storage units (D1–D3, FD6, TL4, STOe) are operatively associated with said data storage server (S1–S3) via one respective distributed management units (DSM1–DSM6), and
an allocation unit arranged to allocate to each of said data storage servers (S1–S3) a virtual memory space (D'xyz) whose extent is at least equal to the accumulated capacity of at least some of said distributed data storage units (D1–D3, FD6, TL4, STOe).

2. The system according to claim 1, wherein said means for allocating are constituted by a series of first data processing means having internally stored distributed management program units ($DSM_1$–$DSM_6$), each said program units adapted for managing some of said data storage units ($D_1$–$D_3$, $FD_6$, $TL_4$, $STO_e$).

3. The system according to claim 1, further comprising second data processing means in the form of centralized management units (NSM) associated with a data base (CDB) of data, said data base (CDB) describing at least the configuration of said data storage units ($D_1$–$D_3$, $FD_6$, $TL_4$, $STO_e$), said centralized management units (NSM) including means for developing and downloading programs from said data into said distributed management program units ($DSM_1$–$DSM_6$), in such a way that the distributed management program units, when associated with the data storage server ($S_1$–$S_3$), allocate to said storage server ($S_1$–$S_3$), under the control of a downloaded program, said virtual memory space ($D'_{xyz}$).

4. The system according to claim 3, wherein said local data storage units are adapted to form a first partition of said virtual memory space (D'xyz), and further including an external memory for data storage units external to said data storage server and forming at least one second partition of said virtual memory space (D'xyz).

5. The system according to claim 4, further comprising a high-speed bus (B) having connected thereto a multitude of "input-output" ports for allowing transmission of said protocol comprising input-output instructions of the read-write type, said distributed management program units ($DSM_1$–$DSM_6$) and said centralized management units (NSM) being connected to one another through said high-speed bus (B), and said input-output instructions sent by said data storage server ($S_1$–$S_3$) being routed by said distributed management program units ($DSM_1$–$DSM_6$), under the control of said downloaded programs, to said local data storage means forming said first partition of the virtual memory space ($D'_{xyz}$) or, via said high-speed bus (B), to said distributed management units ($DSM_1$–$DSM_6$) operatively connected to said external data storage units forming at least one of said second partitions of the virtual memory space ($D'_{xyz}$), depending on whether said instructions relate to one of said partitions or the other, in order to render accessible all of said virtual memory space ($D'_{xyz}$) allocated to said data storage server ($S_1$–$S_3$).

6. The system according to claim 5, characterized in that said high-speed bus (B) is a single-mode optical fiber, and in that said ports comprise a multitude of switches for creating direct transmission channels from each of the connected management program means to all of the switches.

7. The system according to claim 6, characterized in that said data storage means are selected from the group comprising magnetic disk units ($D_1$–$D_3$, $FD_6$), magnetic tape units, magnetic cartridge units ($TL_4$), and optical disks.

8. The system according to claims 7, characterized in that at least one ($STO_e$) of said distributed data storage units is located at a remote site, in that the transmissions between said high-speed remote site and said data processing system (10) take place through high-speed links ($1_{ATM}$) in an asynchronous mode, and in that said links ($1_{ATM}$) are connected to one of said distributed management units ($DSM_5$), said distributed management means being connected to said bus (B).

9. The system according to claim 8, wherein the system is configured so that said programs developed by said centralized management units (NSM) are transmitted through said bus (B) to be selectively downloaded into said distributed management program units ($DSM_1$–$DSM_6$), said programs being written in a predetermined language which renders said programs automatically executable upon said downloading, and in that said centralized management units (NSM) dynamically manages said downloading as a function of parameters that change over time and operations executed by said data processing system.

10. The system according to claim 9, wherein said downloaded programs comprise programs for managing the virtual memory space ($D'_{xyz}$) allocated to each data storage server ($S_1$–$S_3$).

11. The system according to claim 9, wherein said distributed data storage units ($D_1$–$D_3$, $FD_6$, $TL_4$, $STO_e$) is heterogeneous in nature and operates according to different modes and/or protocols, said downloaded programs comprise mode and/or protocol translation programs, so that each storage server ($S_1$–$S_3$) accesses said virtual memory space ($D'_{xyz}$) allocated to it, using protocols of the storage servers.

12. The system according to claim 9, wherein said downloaded programs comprise programs for automatically archiving data, according to a predetermined hierarchy, in the distributed data storage units ($D_1$–$D_3$, $FD_6$, $TL_4$, $STO_e$).

13. The system according to claim 9, characterized in that said downloaded programs comprise programs for backing up data by storing the programs according to a predetermined redundant schema.

14. The system according to claim 9, wherein at least one ($STO_e$) of said distributed data storage units is located at a remote site, and the transmissions between said remote site and said data processing system take place through high-speed links ($1_{ATM}$), in an asynchronous mode, said downloaded programs including data transmission protocol translation programs, said translation programs being downloaded into distributed management units ($DSM_5$) forming an interface between said high-speed bus (B) and said high speed links ($1_{ATM}$) in the asynchronous mode.

15. The system according to claim 13 characterized in that at least some of said distributed management units ($DSM_1$–$DSM_6$) are an integral part of the data storage server ($S_1$–$S_3$) or of said distributed data storage units ($D_1$–$D_3$, $FD_6$, $TL_4$, $STO_e$), with which they are associated so as to form a logical unit of the distributed data storage means.

16. The system according to claim 15 comprising additional data processing units ($ST_1$–$ST_3$), a local area network (LAN) and connecting means for connecting said data processing system (10) to an external data transmission network ($I_T$), and said additional data processing units ($ST_1$–$ST_3$), said connecting means for connecting said system (10) and said data storage servers ($S_1$–$S_3$) are connected to said local area network (LAN).

17. The system according to claim 16, wherein said bus (B) and said local area network (LAN) are combined into a single data transmission network (B), said additional units ($ST_1$–$ST_3$) being connected to said high-speed bus (B) and communicating with one another according to a communications protocol via said high-speed bus (B).

18. A data processing system (10) comprising a plurality of distributed data storage units (D1–D3, FD6, TL4, STOe) and at least one data storage server (S1–S3) connected to a network for storing data, an allocation unit arranged to allocate to each of said data storage servers (S1–S3) a virtual memory space (D'xyz) whose extent is at least equal to the accumulated capacity of at least some of said distributed data storage units (D1–D3, FD6, TL4, STOe), data processing centralized management units (NSM) connected to one another and associated with a data base (CDB) of data describing at least the configuration of said distributed data storage units (D1–D3, FD6, TL4, STOe), said data processing centralized management (NSM) including a unit for developing and downloading programs from said data into distributed management program units (DSM1–DSM6), such that the distributed management program units, when associated with a data storage server (S1–S3), allocate to said storage server (S1–S3), under the control of a downloaded program, said virtual memory space (D'xyz).

19. The system according to claim 18, characterized in that at least some of said data storage units ($D_1$–$D_3$, $FD_6$, $TL_4$, $STO_e$) are connected to said data storage server ($S_1$–$S_3$), via one of said distributed management program units ($DSM_1$–$DSM_6$), so as to form local data storage means having memory space addressable by a protocol comprising read-write input-output instructions sent by said data storage server ($S_1$–$S_3$), said local data storage means being adapted to form a first partition of said virtual memory space ($D'_{xyz}$), and further including data storage means external to said data storage server being able to form at least one second partition of said virtual memory space ($D'_{xyz}$).

20. The system according to claim 19, characterized in that a high-speed bus (B) of the type comprising a multitude of "input-output" ports for allowing the transmission of said protocol comprising read-write input-output instructions, said distributed management program units ($DSM_1$–$DSM_6$) and said centralized management units (NSM) being connected to one another through said high-speed bus (B), and said input-output instructions sent by said data storage server ($S_1$–$S_3$) being routed by said distributed management program units ($DSM_1$–$DSM_6$), under the control of said downloaded programs, to said local data storage means forming said first partition of the virtual memory space ($D'_{xyz}$) or, via said high-speed bus (B), to distributed management program units ($DSM_1$–$DSM_6$) operatively connected to said external data storage means forming at least one of said second additional partitions of the virtual memory space ($D'_{xyz}$), depending on whether said instructions relate to one of said partitions or the other, in order to render accessible all of said virtual memory space ($D'_{xyz}$) allocated to said data storage server ($S_1$–$S_3$).

21. The system according to claim 20, wherein said high-speed bus (B) is a single-mode optical fiber transmission medium, and said ports comprise a multitude of switches to create direct transmission channels from each of the connected management program means to all of the other management program means.

22. The system according to claim 21, wherein said data storage means are selected from the group comprising magnetic disk units ($D_1$–$D_3$, $FD_6$), magnetic tape, magnetic cartridge units ($TL_4$), or optical disks.

23. The system according to claim 22, characterized in that at least one ($STO_e$) of said distributed data storage units is located at a remote site, in that the transmissions between said new site and said data processing system (10) take place through high-speed links ($1_{ATM}$) in the asynchronous mode, and in that said links ($1_{ATM}$) are connected to one of said distributed management units ($DSM_5$), said distributed management means being connected to said high-speed bus (B).

24. The system according to claim 23, wherein the system is configured so that said programs developed by said centralized management units (NSM) are transmitted through said high-speed bus (B) to be selectively downloaded into said distributed management program units ($DSM_1$–$DSM_6$), said programs being written in a predetermined language which renders said programs automatically executable upon said downloading, and in that said centralized management units (NSM) dynamically manages said downloading as a function of parameters that change over time and operations executed by said data processing system.

25. The system according to claim 24, wherein said downloaded programs comprise programs for managing the virtual memory space ($D'_{xyz}$) allocated to each data storage server ($S_1$–$S_3$).

26. The system according to claim 24, wherein said distributed data storage units ($D_1$–$D_3$, $FD_6$, $TL_4$, $STO_e$) is heterogeneous in nature and operates according to different modes and/or protocols, said downloaded programs comprise mode and/or protocol translation programs, so that each storage server ($S_1$–$S_3$) accesses said virtual memory space ($D'_{xyz}$) allocated to it, using protocols of the storage servers.

27. The system according to claim 24, wherein said downloaded programs comprise programs for automatically archiving data, according to a predetermined hierarchy, in the distributed data storage units ($D_1$–$D_3$, $FD_6$, $TL_4$, $STO_e$).

28. The system according to claim 24, characterized in that said downloaded programs comprise programs for backing up data by storing the programs according to a predetermined redundant schema.

29. The system according to claim 24, wherein at least one ($STO_e$) of said distributed data storage units is located at a remote site, and the transmissions between said remote site and said data processing system take place through high-speed links ($1_{ATM}$), in an asynchronous mode, said downloaded programs including data transmission protocol translation programs, said translation programs being downloaded into distributed management units ($DSM_5$) forming an interface between said high-speed bus (B) and said high speed links ($1_{ATM}$) in the asynchronous mode.

30. The system according to claim 28 characterized in that at least some of said distributed management units ($DSM_1$–$DSM_6$) are an integral part of the data storage server ($S_1$–$S_3$) or of said distributed data storage units ($D_1$–$D_3$, $FD_6$, $TL_4$, $STO_e$), with which they are associated so as to form a logical unit of the distributed data storage means.

31. The system according to claim 30 comprising additional data processing units ($ST_1$–$ST_3$), a local area network (LAN) and connecting means for connecting said data processing system (10) to an external data transmission network ($I_T$), and said additional data processing units ($ST_1$–$ST_3$), said connecting means for connecting said system (10) and said data storage servers ($S_1$–$S_3$) are connected to said local area network (LAN).

32. The system according to claim 31, wherein said high-speed bus (B) and said local area network (LAN) are combined into a single data transmission network (B), said additional units ($ST_1$–$ST_3$) being connected to said high-speed bus (B) and communicating with one another according to a communications protocol via said high-speed bus (B).

* * * * *